US 11,599,671 B1

(12) United States Patent
Poorebrahim Gilkalaye et al.

(10) Patent No.: US 11,599,671 B1
(45) Date of Patent: Mar. 7, 2023

(54) SYSTEMS AND METHODS FOR FINDING A VALUE IN A COMBINED LIST OF PRIVATE VALUES

(71) Applicant: TripleBlind, Inc., Kansas City, MO (US)

(72) Inventors: Babak Poorebrahim Gilkalaye, Kansas City, MO (US); Riddhiman Das, Parkville, MO (US); Gharib Gharibi, Overland Park, KS (US)

(73) Assignee: TripleBlind, Inc., Kansas City, MO (US)

( * ) Notice: Subject to any disclaimer, the term of this patent is extended or adjusted under 35 U.S.C. 154(b) by 0 days.

(21) Appl. No.: 17/742,808

(22) Filed: May 12, 2022

(51) Int. Cl.
*G06F 16/00* (2019.01)
*G06F 21/62* (2013.01)
*G06F 16/13* (2019.01)

(52) U.S. Cl.
CPC .......... *G06F 21/6245* (2013.01); *G06F 16/13* (2019.01)

(58) Field of Classification Search
None
See application file for complete search history.

(56) References Cited

U.S. PATENT DOCUMENTS

| | | | |
|---|---|---|---|
| 7,480,308 B1* | 1/2009 | Cohen | H04L 47/34 370/412 |
| 9,646,043 B1* | 5/2017 | Aronovich | G06F 16/951 |
| 2003/0009482 A1* | 1/2003 | Benerjee | G06F 9/5016 |
| 2009/0063485 A1* | 3/2009 | Schneider | G06F 7/026 |
| 2012/0215498 A1* | 8/2012 | Hallquist | G06F 30/23 703/1 |
| 2013/0124491 A1* | 5/2013 | Pepper | G06F 16/90348 707/706 |
| 2013/0188720 A1* | 7/2013 | Wang | H04N 19/147 375/240.16 |
| 2013/0272377 A1* | 10/2013 | Karczewicz | H03M 7/30 341/51 |

(Continued)

*Primary Examiner* — Hasanul Mobin

(57) ABSTRACT

Disclosed is a method for each party of a group of m parties to be able to learn an Nth smallest value in a combined list. The method includes providing a value $R_i$ to a group of members; computing how many numbers are smaller than $R_i$ in a respective list of values for each respective member of the group of members; computing, a total number of smaller values ($P_i$); identifying a position of $R_i$ in a combined list of values comprising each respective list of values; when $N=P_i+1$, returning $R_i$; when N is greater than $P_i+1$, removing all values smaller than $R_i$ in their respective list of values and setting $N=N-(P_i+1)$; when N is less than $P_i+1$, removing all numbers bigger than $R_i$ in their respective list of value; and setting $i=i+1$.

20 Claims, 4 Drawing Sheets

(56) References Cited

U.S. PATENT DOCUMENTS

2014/0371902 A1* 12/2014 McClelland ......... B65G 1/1371
700/218
2015/0242136 A1* 8/2015 Lin ...................... G06F 3/0665
711/114
2018/0095719 A1* 4/2018 Winestock ................ G06F 7/08

* cited by examiner

SYSTEMS AND METHODS FOR FINDING A VALUE IN A COMBINED LIST OF PRIVATE VALUES

TECHNICAL FIELD

The present disclosure generally relates to secure multi-party computations and more specifically to an improved approach to finding an Nth value or the Nth smallest value in a combined list of data from various parties that desire to keep their respective data private.

BACKGROUND

In some scenarios, individuals with private data sets might want to combine or share their data for various purposes such as to have an artificial intelligence analysis performed or to help in a survey. When all the various private data is combined, there may be circumstances where sharing a particular value in the combined list of values might be valuable or useful. However, there is no mechanism of enabling the sharing of a particular nth value of a combined list without sharing other private data with the other members who have contributed data to the combined list.

In one example, countries might gather medical data and the various countries might want to find the median of the various values of the medical data but without revealing the specific medical data from the different countries. The data due to legal issues might not be able to be combined and analyzed to find the median.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Figure 1:
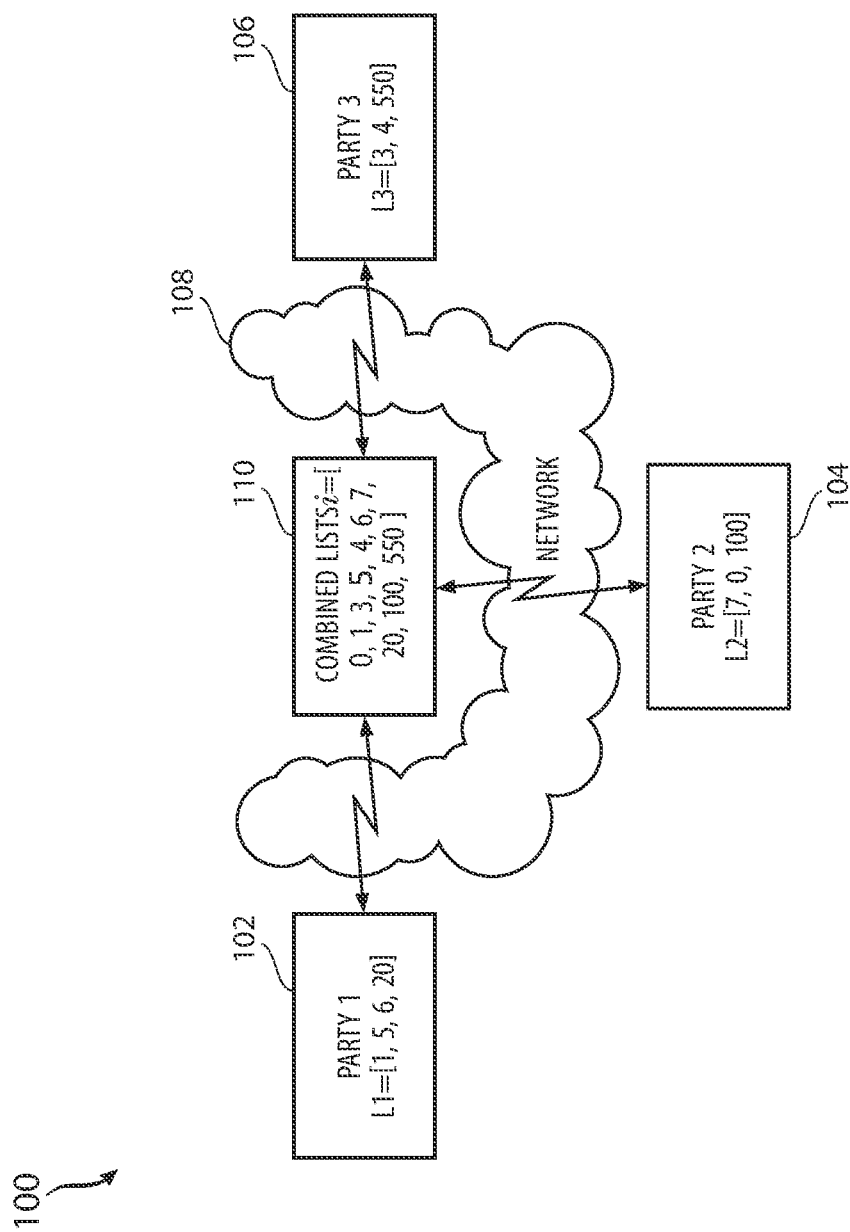
FIG. 1 illustrates a group of parties each with private data.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

In order to address the issue of how to share an Nth value of a combined list with the various members who shared private data to the combined list, the following system and method are disclosed. As noted above, the issue of combining the data might not be possible where a median or other value might be desired to be identified from the lists if they were combined.

The method includes one or more of the following steps: (1) providing a value $R_i$ to a group of members; (2) computing, by each member of the group of members and via at least one processor, how many numbers are smaller than $R_i$ in a respective list of values for each respective member of the group of members to yield a respective number of values smaller than $R_i$; (3) computing, via the at least one processor, by each member of the group of members and using a secure multi-party computation protocol and the respective number of values smaller than $R_i$, a total number of smaller values ($P_i$); (4) identifying a position of $R_i$ in a combined list of values comprising each respective list of values, the position of $R_i$ equaling $P_i+1$; (5) when $N=P_i+1$, returning $R_i$; (6) when N is greater than $P_i+1$, removing, by each member, all values smaller than $R_i$ in their respective list of values and sets $N=N-(P_i+1)$; (7) when N is less than $P_i+1$, removing, by each member, all numbers bigger than $R_i$ in their respective list of value; (8) setting, via the at least one processor, $i=i+1$; and (9) returning to an earlier step such as step (5). Step (6) can include also the party revealing $R_i$ removing their $R_i$ from their respective list. If another party has the same number in their list, it is not removed as part of step (6). Further, step (7) can also include the party revealing $R_i$ removing their $R_i$ from their respective list. If another party has the same number in their list, it is not removed as part of step (6)

A system can include a processor and a computer-readable storage device storing instructions which, when executed by the processor, cause the processor to perform operations or steps including one or more operations of: (1) providing a value $R_i$ to the group of members; (2) computing, by each member of the group of members and via at least one processor, how many numbers are smaller than $R_i$ in a respective list of values for each respective member of the group of members to yield a respective number of values smaller than $R_i$; (3) computing, via the at least one processor, by each member of the group of members and using a secure multi-party computation protocol and the respective number of values smaller than $R_i$, a total number of smaller values ($P_i$); (4) identifying a position of $R_i$ in a combined list of values comprising each respective list of values, the position of $R_i$ equaling $P_i+1$; (5) when $N=P_i+1$, returning $R_i$; (6) when N is greater than $P_i+1$, removing, by each member, all values smaller than $R_i$ in their respective list of values and sets $N=N-(P_i+1)$; (7) when N is less than $P_i+1$, removing, by each member, all numbers bigger than $R_i$ in their respective list of value; (8) setting, via the at least one processor, $i=i+1$; and (9) returning to an earlier step such as step (5).

DETAILED DESCRIPTION

As introduced above, the disclosure in this case introduces a specific approach of enabling parties having private data that is combined into a larger combined list of data to be able to securely compute an Nth smallest value of the combined list without sharing the rest of their data with the other parties. In another aspect, the goal is to find the Nth smallest value in the combined list. Note that in one aspect, the combined list may or may not ever actually be combined in any one memory location. The combined list is a concept that is actually ever performed in practice. However, the process disclosed herein enables the sharing of some data as described that enables the parties each having their portion of the "combined list" to determine the Nth smallest value of the "combined list" or the data of all the parties.

Figure 2:
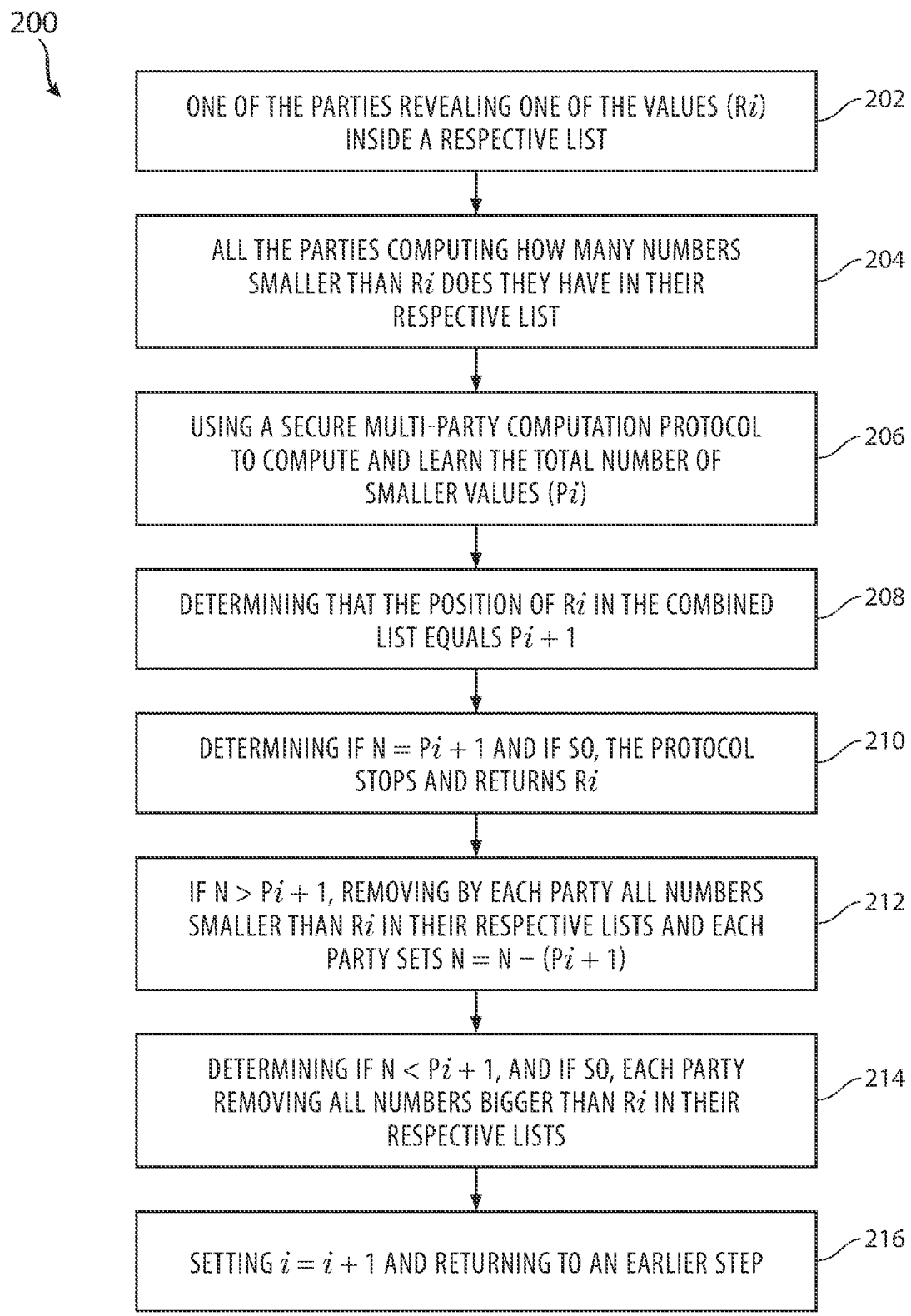
FIG. 2 illustrates a method embodiment.
Figure 3:
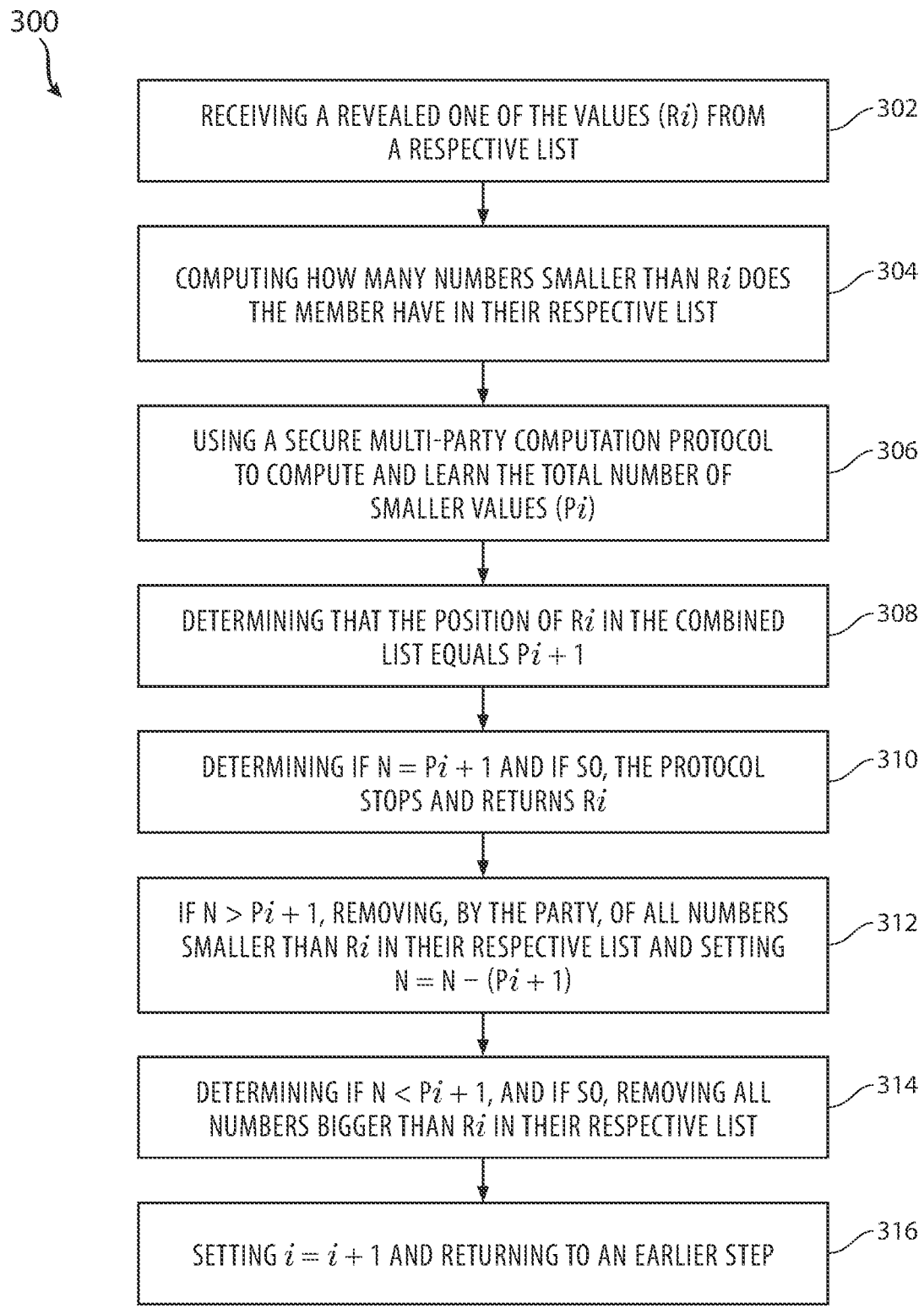
FIG. 3 illustrates another method embodiment.

A detailed example of how this process works shall be explained with respect to FIGS. 1-3. FIG. 1 illustrates a framework 100 in which a first party 102 has example data L1=[1, 5, 6, 10], a second party 104 has a respective list of data L2=[7, 0, 100] and a third party 106 has its private data L3=[3, 4, 550]. In one example, the various respective lists of data are stored on computer-readable media on various computer systems. Each of the components 102, 104, 106 can represent the respective computer system of the respective party. The component 108 can represent the shared list which includes each combined list of data from the respective parties 102, 104, 106. Again, the respective lists can be shared over any type of network such as the Internet or a wireless network, cellular network and so forth.

Each party contributed their private lists of data to a combined list of data Si. Si=[0, 1, 3, 4, 5, 6, 7, 20, 100, 550]. Again, in one aspect, this is only in theory and the parties never actually share their data at a location that combined the various lists together. This figure therefore is used to show conceptually how the combined list might exist logically but not physically. The combined list in other words is the combination of the various lists that physically remain private on the computer systems of the various parties. The output of the solution disclosed herein is the Nth smallest value.

The number of participants can be termed "m" and $1 \leq i \leq m$. The total numbers in the combined list Si is S=s1+ . . . +sn. The algorithm disclosed herein enables the various parties to securely compute the Nth value of the combined list Si. Note that the approach could be used a number of different times to find various Nth values. Also note that in this example, the data is numerical although in other aspects the data might not be numerical or might be a combination of numerical data and non-numerical data.

Next, several examples shall be provided of the algorithm in practice. Assume in one example that there are the three parties shown in FIG. 1 with data: L1=[1, 5, 6, 10], L2=[7, 0, 100] and L3=[3, 4, 550]. The combined list is Si=[0, 1, 3, 4, 5, 6, 7, 20, 100, 550]. Note that the data in the combined list is provided in numerical order. In another aspect, the combined list might be in reverse numerical order, or in any other order. The goal is to determine or compute the Nth value in the combined list. The protocol or algorithm can be shown as a method embodiment in FIG. 2. A method 200 includes performing a loop of steps until the loop ends on step (5). The first (1) step involves one of the parties revealing one of the values (Ri) inside their respective list (202). The second (2) step includes all the parties 102, 104, 106 computing how many numbers smaller than Ri does they have in their respective list (204). The third (3) step includes using a secure multi-party computation protocol to compute and learn the total number of smaller values (Pi) (206). An example of such protocols is found in U.S. patent application Ser. No. 16/828,216, filed on Mar. 24, 2020. The fourth (4) step includes determining that the position of Ri in the combined list equals Pi+1 (208). The fifth (5) step includes determining if N=Pi+1 and if so, the protocol stops and returns Ri (210). If N does not equal Pi+1, the method continues on to the sixth step. The sixth (6) step is if N>Pi+1, each party removes all numbers smaller than Ri in their respective lists and each party sets N=N−(Pi+1) (212). The seventh (7) step determines if N<pi+1, each party removes all numbers bigger than Ri in their respective lists (214). The eighth (8) step sets i=i+1 and returns to an earlier step such as step (5) (216). The protocol continues to loop until N=Pi+1 and the protocol stops.

A specific example will help understand the process. Assume that the goal is to find the third value N=3 in the combined list Si. This can also include determining the third smallest value or third largest value in the list. From step (1), assume that the third user 106 reveals R1=4. This is the fourth or smallest value in the combined list Si=[0, 1, 3, 4, 5, 6, 7, 20, 100, 550] and is contributed from L3. In step (2), user 1 has only one value smaller than R1 (p1=1), and user 2 has one value smaller than R1 (p2=1) and user 3 has one value smaller than R1 (p3=1). In step (3), using a computation protocol such as the Secure Multi Party Computation (SMPC) protocol, each party creates a random share of Pj and they will compute and learn that P1=3. This can be done using additive shares in which, for example, for user 1, p1=1. Creating random shares of this value could be generating a random pair 2, −4. These are "shares" of 1. 2−4=−2. The last value would be 3 such that the additive shares 2−4+3=1=p1. User 1 then shares the "2" with one other user and the "−4" with another. Each user does this and, in this way, the other users don't know how many values the other users have less than the revealed value of R1=4 in the combined list. The SPMC protocol causes these calculations to be done in this "shared space" in which the individual members perform calculations on data that is random data and not on the actual data that would reveal values in other party's lists.

There are three total numbers (0, 1, 3) less than or smaller than the revealed number R1=4. In step (4), the position of R1=4 is P1 (3)+1=4 in the combined list. In step (5), the calculated position (four) is not what the result the system is looking for since the desire is to find what the third smallest value of the combined list is, and thus the process moves on to step (6). Step (6) does not apply since the calculated position is Pi (3)+1=4 which is bigger than the expected position (N=3). Step (7) does apply since the calculated position (Pi+1=4) is bigger than the expected position (N=3). Thus, each party updates their list and removes all values bigger than R1=4. Further, the party who revealed 4 will remove their 4 from their list. If other parties have a 4 in their respective lists, they will not remove their 4. This leaves L1=[1], L2=[0] and L3=[3]. In step (8), i=i+1 and the parties repeat the protocol with the updated lists. At this stage, i=2 and N is still 3. In this case, the combined list becomes Si=[0, 1, 3].

In the second pass through the protocol, N=3, i=2. Step (1) involves, for example, user 1 reveals that R2=1. At step (2), user 1 has no values smaller than R2=1 (p1=1) since L1=[1], user 2 has one value smaller (L2=[0]) than R2 (p2=1) and user 3 has no values smaller than R2 (p3=1) since L3=[3]. Each party will run the SMPC protocol and create a random share of Pj and they will compute and learn that P2=1, meaning that there is a total number of 1 value (the "0" in L2) smaller than R2=1. Step (5) asks whether R2=1=P2+1. In this case it does not as P2=1 and 1+1=2. Thus, since N (which is 3) is greater than P1 (1)+1 as outlined in step (6), this step (and not step (7)) applies and each party removes all numbers smaller than R2 (1) in their lists and sets N=3−(P1 (1)+1) which results in 3−2=1. Further, party 1 revealed R2=1 so that party removes the 1 from their list. Note that no other parties, if they had a 1 in their lists, would remove their respective 1's at this stage. Thus, at this stage, N=1. The result in updated lists as follows: L1=[ ], L2=[ ] and L3=[3]. The protocol then repeats with the updated lists.

In this iteration, i=i+1 or 3 and N=1. Only L3 has a value left so assume that L3 reveals "3" as R3 in step (1). Therefore, R3=3. In step (2), user 1 has zero values smaller than R3 (P1=0), user 2 has no values smaller than R3 (P2=0) and user 3 has zero values smaller than R3 (P3=0). Each party will run the SMPC protocol and create a random share of Pj and they will compute and learn that P3=0, meaning that there is a total number of 0 values smaller than R3=3. Step (5) asks whether N=1=P3 (0)+1=1. In this case it does as P3=0 and 0+1=1. Note that in this case since the protocol has now completed, it will reveal that the value of R3 is 3 which is the third number in the combined list Si=[0, 1, 3, 4, 5, 6, 7, 20, 100, 550] as a conclusion to the protocol. What this means is that for the chosen item in the list N=3, that the protocol has determined that the value at position 3 in the list is smaller than the revealed value of 4.

Note that in one aspect this can enable the parties to learn the value of the Nth position in the combined list, or it may simply be that the parties can learn that the Nth value is smaller than the revealed value. Specifically, the parties learn that the Nth value (3) is smaller than R1 (4) and bigger than R2(1) or more broadly they learn whether the Nth value is bigger or smaller than the various Ri's.

In total O(log(S)) steps (S is the total numbers in the combined list as noted above) are needed to compute the Nth number inside the combined list. The "O" is a specific notation that means it is not the exact value because the system cannot predict the exact number of steps as that number depends on the random numbers used, but the system can determine the order of it is a log value. So O(log(S)) numbers will be revealed and learned by all parties. In one experiment by the inventors, 18 numbers out of 4 million pieces of data are revealed in the iterative process until the Nth value was identified. In addition to the Nth number, all parties may learn the position of O(log(S)) numbers.

In some cases, data may be of a limited range or may be quantized data. For example, databases may include data relates to an age of a group of people, which would therefore be limited in range. The system can randomly select Ri as opposed to revealing one of the values inside of the lists. But it will add more computational complexity to the protocol depending on the range of the data.

FIG. 3 illustrates an example method 300 from the standpoint of an individual computing device of a member. In this regard, the method includes a first (1) step of receiving a revealed one of the values (Ri) from a respective list (302). The second (2) step includes computing how many numbers smaller than Ri does the member have in their respective list (304). The third (3) step includes using a secure multi-party computation protocol to compute and learn the total number of smaller values (Pi) (306). The fourth (4) step includes determining that the position of Ri in the combined list equals Pi+1 (308). The fifth (5) step includes determining if N=Pi+1 and if so, the protocol stops and returns Ri (310). If N does not equal Pi+1, the method continues on to the sixth step. The sixth (6) step is if N>Pi+1, each party removes all numbers smaller than Ri in their respective list and the party sets N=N−(Pi+1) (312). The seventh (7) step causes each party to determine if N<Pi+1, and if so, the party removes all numbers bigger than Ri in their respective list (314). The eighth (8) step sets i=i+1 and returns to an earlier step such as step (5) (316). This embodiment relates to the processing from the viewpoint of the computing device associated with one party of the group of parties that have data. Note that step (6) can include also the party revealing Ri removing their Ri from their respective list. If another party has the same number in their list, it is not removed as part of step (6). Further, step (7) can also include the party revealing Ri removing their Ri from their respective list. If another party has the same number in their list, it is not removed as part of step (6)

Figure 4:
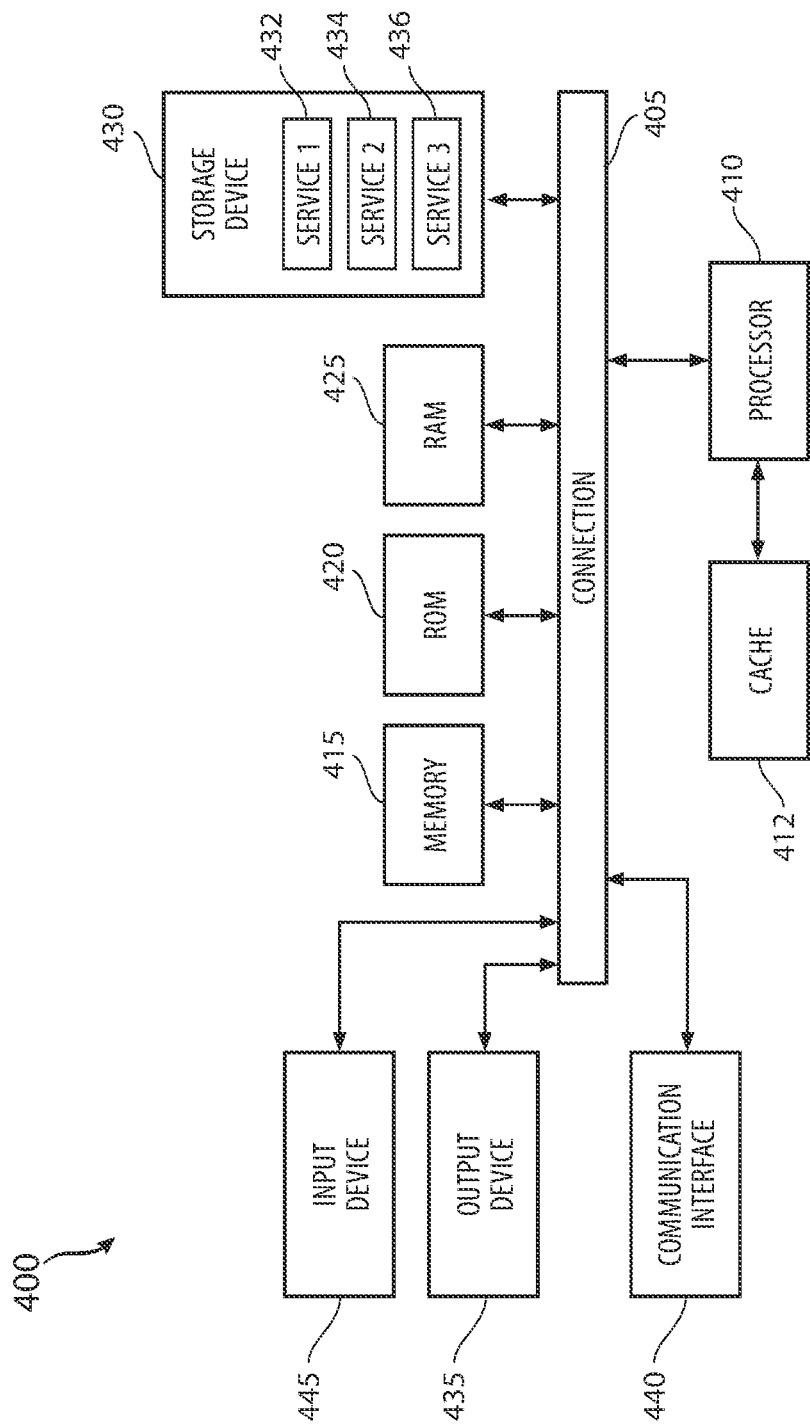
FIG. 4 illustrates an example system embodiment.

FIG. 4 illustrates example computer device that can be used in connection with any of the systems disclosed herein. In this example, FIG. 4 illustrates a computing system 400 including components in electrical communication with each other using a connection 405, such as a bus. System 400 includes a processing unit (CPU or processor) 410 and a system connection 405 that couples various system components including the system memory 415, such as read only memory (ROM) 420 and random-access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general-purpose processor and a hardware or software service or module, such as service (module) 1 432, service (module) 2 434, and service (module) 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable user interaction with the device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services or modules 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be utilized individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:
1. A method of computing a value at a position N in a combined list of values, the method comprising:
   (1) providing a value $R_i$ to a group of members;
   (2) computing, by each member of the group of members and via at least one processor, how many numbers are smaller than $R_i$ in a respective list of values for each respective member of the group of members to yield a respective number of values smaller than $R_i$;
   (3) computing, via the at least one processor, by each member of the group of members and using a secure multi-party computation protocol and the respective number of values smaller than $R_i$, a total number of smaller values ($P_i$);
   (4) identifying, via the at least one processor, a position of $R_i$ in a combined list of values comprising each respective list of values, the position of $R_i$ equaling $P_i+1$;
   (5) when $N=P_i+1$, returning $R_i$;
   (6) when N is greater than $P_i+1$, removing, by each member and via the at least one processor, all values smaller than $R_i$ in their respective list of values and sets $N=N-(P_i+1)$;
   (7) when N is less than $P_i+1$, removing, by each member and via the at least one processor, all numbers bigger than $R_i$ in their respective list of value;
   (8) setting, via the at least one processor, an iteration value $i=i+1$; and
   (9) returning to step (5).

2. The method of claim 1, wherein $R_i=P_i+1$.

3. The method of claim 1, wherein step (1) further comprises revealing, by a first member of a group of members, the value $R_i$ as a value inside a list of values for the first member.

4. The method of claim 1, wherein at least one value of the combined list of values is a limited-range value.

5. The method of claim 4, wherein when the at least one value of the combined list of values is the limited-range value, step (1) further comprises randomly selecting $R_i$.

6. The method of claim 5, wherein $R_i$ is independent of the combined list of values.

7. The method of claim 1, wherein $O(\log(S))$ numbers are revealed and learned by the group of members.

8. The method of claim 1, wherein:
- (6) when N is greater than $P_i+1$, removing, by each member and via the at least one processor, all values smaller than $R_i$ in their respective list of values and sets $N=N-(P_i+1)$ to yield a first updated respective list of values;
- (7) when N is less than $P_i+1$, removing, by each member and via the at least one processor, all numbers bigger than $R_i$ in their respective list of value to yield a second updated respective list of values;
- (8) $i=i+1$; and
- (9) return to step (5) to continue the method using one of the first updated respective list of values or the second updated respective list of values.

9. The method of claim 1, wherein $P_i$ equals the number of values in the respective list of values for each user that are smaller than $R_i$ and $P_i$ equals the total number of smaller values smaller than $R_i$ in the combined list.

10. The method of claim 1, wherein step (6) further comprises only the member revealing $R_i$ to remove $R_i$ from their respective list and wherein step (7) further comprises only the member revealing $R_i$ to remove $R_i$ from their respective list.

11. A system for computing a value at a position N in a combined list of values, the system comprising:
- at least one processor; and
- a computer-readable storage device storing instructions which, when executed by the processor, cause the processor to perform operations comprising:
  - (1) providing a value $R_i$ to a group of members;
  - (2) computing, by each member of the group of members, how many numbers are smaller than $R_i$ in a respective list of values for each respective member of the group of members to yield a respective number of values smaller than $R_i$;
  - (3) computing, via the at least one processor, by each member of the group of members and using a secure multi-party computation protocol and the respective number of values smaller than $R_i$, a total number of smaller values ($P_i$);
  - (4) identifying a position of $R_i$ in a combined list of values comprising each respective list of values, the position of $R_i$ equaling $P_i+1$;
  - (5) when $N=P_i+1$, returning $R_i$;
  - (6) when N is greater than $P_i+1$, removing, by each member, all values smaller than $R_i$ in their respective list of values and sets $N=N-(P_i+1)$;
  - (7) when N is less than $P_i+1$, removing, by each member, all numbers bigger than $R_i$ in their respective list of value;
  - (8) setting an iteration value $i=i+1$; and
  - (9) returning to step (5).

12. The system of claim 11, wherein $R_i=P_i+1$.

13. The system of claim 11, wherein step (1) further comprises revealing, by a first member of a group of members, the value $R_i$ as a value inside a list of values for the first member.

14. The system of claim 11, wherein at least one value of the combined list of values is a limited-range value.

15. The system of claim 14, wherein when the at least one value of the combined list of values is the limited-range value, step (1) further comprises randomly selecting $R_i$.

16. The system of claim 15, wherein $R_i$ is independent of the combined list of values.

17. The system of claim 11, wherein $O(\log(S))$ numbers are revealed and learned by the group of members.

18. The system of claim 11, wherein:
- (6) when N is greater than $P_i+1$, removing, by each member, all values smaller than $R_i$ in their respective list of values and sets $N=N-(P1+1)$ to yield a first updated respective list of values;
- (7) when N is less than $P_i+1$, removing, by each member, all numbers bigger than $R_i$ in their respective list of value to yield a second updated respective list of values;
- (8) $i=i+1$; and
- (9) return to step (5) to continue the method using one of the first updated respective list of values or the second updated respective list of values.

19. The system of claim 11, wherein $P_i$ equals the number of values in the respective list of values for each user that are smaller than $R_i$ and $P_i$ equals the total number of smaller values smaller than $R_i$ in the combined list.

20. The system of claim 11, wherein operation (6) further comprises only the member revealing $R_i$ to remove $R_i$ from their respective list and wherein operation (7) further comprises only the member revealing $R_i$ to remove $R_i$ from their respective list.

* * * * *